March 12, 1957 — R. A. MARTIN — 2,784,931

SUPPORTS

Filed Dec. 1, 1952

RUSSELL A. MARTIN
INVENTOR.

BY

ATTORNEY

United States Patent Office 2,784,931
Patented Mar. 12, 1957

2,784,931
SUPPORTS

Russell A. Martin, Dallas, Tex.

Application December 1, 1952, Serial No. 323,375

4 Claims. (Cl. 248—313)

This invention relates to supports, and more particularly to a support on a motor vehicle to hold a can of lubricating oil, brake fluid, transmission oil or similar material for use in a motor vehicle.

It is an object of the invention to provide a support mountable on a vehicle for holding a can or the like.

Another object is to provide such a support which permits some movement between the can and the vehicle member on which it is mounted whereby shocks and vibrations of the vehicle will not dislodge the can from the support and will not damage the support.

Still another object of the invention is to provide a support having a pair of vertically spaced clamping disks yieldingly biased toward each other whereby said disks may move relative to one another to accommodate cans of varying lengths placed therebetween.

A further object of the invention is to provide a support having a pair of vertically spaced clamping disks for holding a can therebetween which are resiliently mounted on a member of a vehicle so that shocks and vibrations of the vehicle are absorbed by the resilient mounting to prevent damage to the can and to the support.

A still further object of the invention is to provide a support for holding cans having opposed holding or clamping means which are movable toward and away from one another whereby cans may be easily inserted between and removed from the clamping means.

Still another object of the invention is to provide the holding or clamping means with resilient latch means for locking the clamping means in can holding position.

Further objects and advantages of the invention will readily be apparent from the reading of the following description of a device constructed in accordance with the invention, and reference to the accompanying drawings thereof, wherein.

Figure 1:
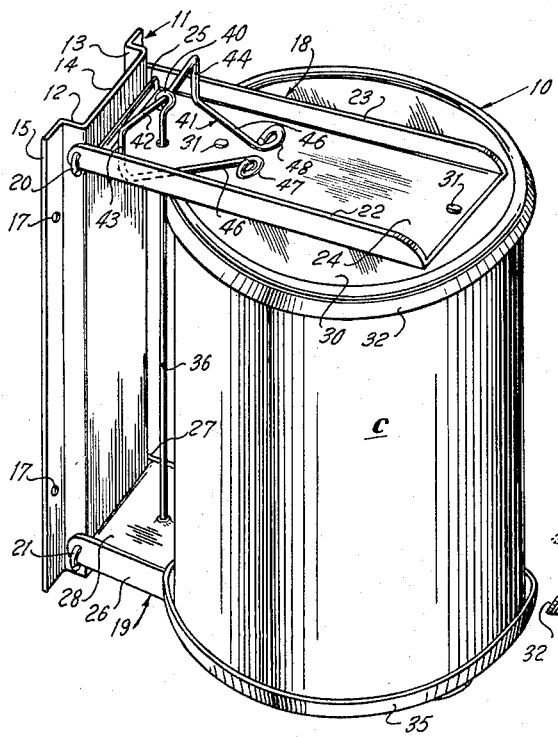
Figure 1 is a perspective view of the support for holding cans.

In the drawing, the reference numeral 10 designates generally the support which includes a channel shaped wall bracket 11 having a pair of intermediate vertical flanges 12 and 13 extending perpendicularly from a central web 14 and a pair of lateral securing flanges 15 and 16 extending outwardly from the intermediate flanges 12 and 13, respectively, and lying parallel to the central web. The securing flanges are provided with a plurality of apertures 17 through which screws, bolts or the like may extend to secure the bracket to the fire wall (not shown) or other supporting member or part of a vehicle.

A pair of channel shaped supporting arms 18 and 19 are pivotally mounted at vertically spaced positions on the wall bracket by means of pins 20 and 21, respectively. The pin 20 extends through registering apertures in the intermediate flanges 12 and 13 of the wall bracket and in the inner end portions of the flanges 22 and 23 of the upper supporting arm 18. The inner end portions of the flanges 22 and 23 extend inwardly beyond the central web 24 of the upper supporting arm, and the inner end portion of the web may be bent upwardly and then downwardly to form a reinforcing flange 25 between the flanges 22 and 23.

The pin 21 similarly extends through registering apertures in the intermediate flanges 12 and 13 of the wall bracket and in the inner end portions of the flanges 26 and 27 of the lower supporting arm 19. The inner end portions of the flanges 26 and 27 extend inwardly beyond the central web 28 of the lower supporting arm whose inner end portion may also be bent downwardly and then upwardly to form the reinforcing flange 29 between said flanges 26 and 27. The flange 29 limits the downward pivotal movement of the lower supporting arm when said flange engages the central web 14 of the wall bracket.

It will be apparent now that the upper and lower supporting arms are pivotally mounted on the wall bracket for pivotal movement about vertically spaced parallel horizontal axes.

A round pan or disk 30 is secured to the underside of the upper supporting arm by means of rivets 31 or in any other suitable manner. The upper pan 30 is provided with a downwardly and outwardly extending peripheral flange 32. A similar round pan or disk 33 is secured to the top side of the lower supporting arm by means of rivets 34 or in any other suitable manner. The lower pan 33 is provided with an upwardly and outwardly extending peripheral flange 35.

The flanges 32 and 35 of the clamping pans or disks, being outwardly flared or tapered and opposed to one another, are adapted to engage and hold opposite ends of a can disposed between the disks, the flared flanges accommodating slight variations in the sizes of the cans disposed between the disks, and also facilitating positioning of the ends of the cans in the disks.

A clamping rod 36 extends through apertures in the webs 24 and 33 of the upper and lower supporting arms adjacent the reinforcing flanges 25 and 29 thereof and between the disks and the wall bracket. A pressure spring 37 is disposed about the lower end of the clamping rod between the central web 28 of the lower supporting arm and a washer 38 retained on the rod by an upset head 39 on the lower end of the clamping rod. The washer could also be retained on the rod by a cotter pin, a nut or by any other suitable means.

The upper end of the clamping rod extends above the central web 24 of the upper supporting arm and is bent to form an eye 40. A spring latch 41 has a transverse central portion or bar 42 which extends through the eye so that the latch is swingable pivotally about the transverse central portion between its solid line and broken positions illustrated in Figure 2. The bar portion is inclined slightly downwardly from each end toward its center as shown in Fig. 3, which tends to maintain the eye 40 of the clamping rod 36 in place near the center of said bar portion. Intermediate legs 43 and 44 of the latch extend downwardly from opposite ends of the central portion to the handle extensions 45 and 46 which extend outwardly and upwardly between the flanges 22 and 23 of the upper supporting arm. The handle extensions also converge toward each other and their outer end portions are bent outwardly and back to form finger loops 47 and 48, respectively.

It will be noted that the finger loops are spaced above the central web 24 so that fingers may be inserted below the finger loops whereby the latch may be pivoted upwardly into the broken line position shown in Fig. 2. The latch is made of a resilient material, such as steel, so that the transverse central portion 42 will be biased resiliently downwardly when in the position shown in Fig. 1, with the lower ends of the intermediate legs 43 and 44 contacting the upper surface of the central web 24 of the upper supporting arm to urge the supporting arms toward one another. The legs of the latch also tend to bend resiliently due to the force exerted on the transverse central portion by the spring 37 acting on the clamping rod when in the position shown in Fig. 1. When the latch is in the broken line position, shown in Figure 2, the legs 43 and 44 do not contact the central web 24 and the supporting arms are free to pivot away from each other.

In use, the wall bracket 11 is secured to the fire wall of a vehicle by screws, bolts or any other suitable means. The latch 41 is then moved to the broken line position shown in Fig. 2, thus leaving the supporting arms 18 and 19 free to pivot away from each other about their pins 20 and 21. A can of the desired fluid is then inserted between the clamping pans or disks 30 and 33 with the flanges 32 and 35 thereof engaging the upper and lower peripheries of the cans. The extensions 45 and 46 of the latch are then swung downwardly so that the lower ends of the legs 43 and 44 of the latch contact the upper supporting arm and cause the clamp rod 36 to be pulled upwardly against the resistance of the spring 37, the transverse central portion 42 of the latch rotating in the eye 40 and exerting an upward force thereon. The transverse central portion and the legs of the latch, being of resilient substance, tend to be bent and exert a yielding or biasing force which tends to yieldably move the supporting arms toward one another. The spring 37, of course, also exerts a biasing force urging the supporting arms toward one another. The can C is, therefore, held firmly between the clamping disks. Shock and vibrations to which the vehicle is subjected will tend to cause the supporting arms to pivot simultaneously upwardly or downwardly, the spring 37 and the resilience of the latch permitting some movement of the supporting arms relative to the clamping rod and therefore relative to the wall bracket. In this manner, the supporting arms and the can held between them are resiliently mounted on the wall bracket. This resilient mounting of the support arms for limited pivotal movement protects the support and the can from shocks and vibrations which could damage the support.

Figure 2:
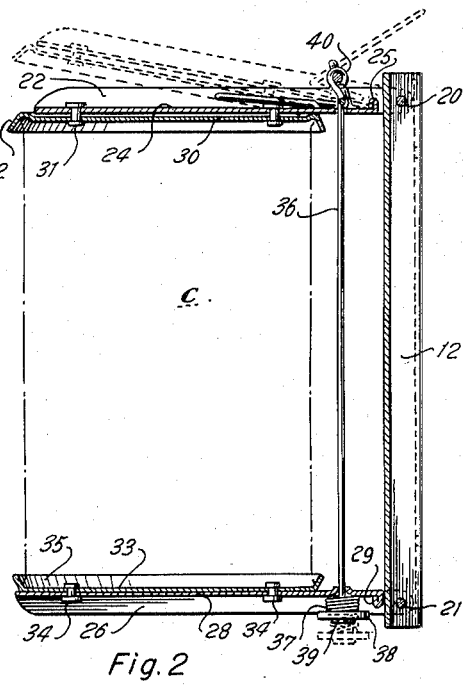
Figure 2 is a vertical sectional view of the support shown in Figure 1.
Figure 3:
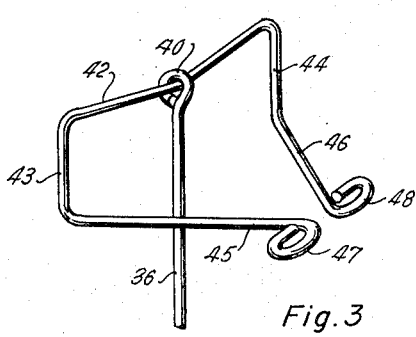
Figure 3 is a perspective view of a spring latch of the support.

When it is desired to remove the can, the finger loops of the latch are seized and swung upwardly to move the latch to the broken line position of Figure 2. The supporting arms can then be moved away from one another and the can freed for removal.

It will be seen now that a support for holding cans has been provided which includes a wall bracket 11 which can be rigidly secured to the fire wall of a vehicle, and a pair of vertically spaced supporting arms 18 and 19 pivotally secured to the wall bracket for movement about spaced parallel horizontal axes. It will also be seen that the arms have been provided with opposed clamping pans and disks 30 and 33 adapted to engage and hold a can disposed therebetween, and that a clamping rod 36 has been provided which cooperates with a latch 41 and a spring 37 to yieldingly urge the supporting arms toward one another whereby the can is held securely between the clamping disks, and the supporting arms are permitted to move with respect to the wall bracket against the yielding force exerted by the spring and the latch to cushion shocks and vibrations, and to accommodate cans of slightly varying lengths. It will also be apparent that the latch 41 permits easy removal and insertion of cans.

The foregoing description of the invention is explanatory only, and changes in the details of the construction illustrated may be made by those skilled in the art, within the scope of the appended claims, without departing from the spirit of the invention.

What I claim and desire to secure by Letters Patent is:

1. A support of the type described including: a wall bracket; a pair of supporting arms each having one end pivotally secured to said wall bracket for movement about a horizontal axis; said horizontal axes being parallel and vertically spaced; opposed can engaging means on said supporting arms; a clamp rod extending between said supporting arms and through apertures provided in said supporting arms between said can engaging means and said wall bracket; said clamp rod having end portions extending beyond said support arms; a spring disposed about and confined on one of said end portions and contacting the adjacent supporting arm to yieldingly bias said rod against movement in one direction relative to said adjacent support arms; and a latch connected to the other of said end portions and engaging the adjacent supporting arm for preventing movement of said supporting arms away from each other.

2. A support of the type described including: a wall bracket; a pair of supporting arms each having one end pivotally secured to said wall bracket for movement about a horizontal axis; said horizontal axes being parallel and vertically spaced; opposed clamping disks on said supporting arms; said disks having opposed outwardly tapering circular flanges; a clamp rod extending between said supporting arms and through apertures provided in said supporting arms between said clamping disks and said wall bracket; said clamp rod having end portions extending beyond said supporting arms; a spring disposed about and confined on one of said end portions and contacting the adjacent supporting arm to yieldingly bias said rod against movement in one direction relative to said adjacent supporting arm; and a latch connected to the other of said end portions and engaging the adjacent supporting arm for preventing movement of said supporting arms away from each other.

3. The device of claim 1 wherein said latch includes a transverse central portion pivotally connected to said other of said end portions for movement about a horizontal axis parallel to said first mentioned horizontal axes; and a pair of parallel legs extending angularly from said transverse central portion and adapted to engage the adjacent supporting arm when said transverse central portion is pivoted to latching position.

4. A support of the type described including: a wall bracket having a pair of parallel vertical flanges; a pair of channel shaped supporting arms each having a pair of parallel side flanges extending perpendicularly from a central web; said side flanges of each supporting arm having portions extending at one end beyond said central web; said extending portions of said side flanges of each of said supporting arms being pivotally secured to said vertical flanges for movement about a horizontal axis, said horizontal axes being parallel and vertically spaced; opposed can engaging means secured to said supporting arms; a clamp rod extending between said supporting arms and through apertures provided in the central webs of said supporting arms between said can engaging means and said wall bracket; said clamp rod having end portions extending beyond said central webs; a spring disposed about one of said end portions and confined against displacement therefrom, said spring contacting the central web of the adjacent supporting arm to yieldingly bias said clamp rod against movement in one direction relative to said adjacent supporting arm; and a latch connected to the other of said end portions and engaging the central web of the adjacent supporting arm for preventing movement of said supporting arms away from each other.

References Cited in the file of this patent
UNITED STATES PATENTS

| | | |
|---|---|---|
| 1,237,217 | Poltronieri | Aug. 14, 1917 |
| 1,292,480 | Kessel | Jan. 28, 1919 |
| 1,328,271 | Detemple | Jan. 20, 1920 |
| 1,347,116 | Morgan | July 20, 1920 |
| 1,529,214 | Roos | Mar. 10, 1925 |
| 1,589,521 | England | June 22, 1926 |
| 1,951,009 | Davisson | Mar. 13, 1934 |
| 2,021,417 | Hoffman | Nov. 19, 1935 |
| 2,049,964 | Sawsan | Aug. 4, 1936 |